United States Patent [19]

Wolfinger

[11] 4,121,272
[45] Oct. 17, 1978

[54] TORSIONAL OSCILLATION ALARM SYSTEM

[75] Inventor: John F. Wolfinger, Schenectady, N.Y.

[73] Assignee: General Electric Company, Schenectady, N.Y.

[21] Appl. No.: 792,661

[22] Filed: May 2, 1977

[51] Int. Cl.² ............................................... G01H 1/10
[52] U.S. Cl. ...................................... 361/236; 73/650; 73/654
[58] Field of Search ...................... 73/650 (U.S. only), 73/652 (U.S. only), 654 (U.S. only), 70.1, 71.2, 71.4; 361/236, 239; 340/261, 262, 65

[56] References Cited

U.S. PATENT DOCUMENTS

| 3,455,148 | 7/1969 | Foster et al. | 73/654 |
| 3,455,149 | 7/1969 | Foster et al. | 73/654 |
| 3,506,957 | 4/1970 | Davidson | 73/654 |
| 3,783,680 | 1/1974 | Mason | 73/654 |
| 3,885,420 | 5/1975 | Wolfinger | 73/650 |
| 3,934,459 | 1/1976 | Wolfinger et al. | 73/650 |
| 4,057,791 | 11/1977 | Bimmerle et al. | 340/261 |

*Primary Examiner*—Gerald Goldberg
*Attorney, Agent, or Firm*—John F. Ahern; James W. Mitchell

[57] ABSTRACT

An alarm system is disclosed for generating alarms when torsional oscillations of a rotating shaft exceed predetermined limits and fail to subside at a predetermined rate. The alarm system receives a torsional oscillation input signal developed by measuring the deviation of instantaneous shaft angle from a uniformly increasing value. The input signal is converted to a direct current torsional oscillation signal representative of the magnitude of oscillation. The torsional oscillation signal is compared against a first adjustable reference voltage representative of a first maximum magnitude of oscillation. A low level alarm signal is generated when the oscillation signal exceeds the first reference voltage for a predetermined length of time. The oscillation signal is also compared against a second reference voltage representative of a second maximum magnitude of oscillation. An output signal is generated when the oscillation signal exceeds the second reference voltage. The output signal is then employed to activate a rate of decay circuit which generates a signal representative of the rate of decay of the oscillation signal. This representative rate of decay signal is compared against a third reference voltage representative of a minimum acceptable rate of decay. If the representative rate of decay signal exceeds the third adjustable reference voltage, a high level alarm signal is generated to indicate that the second maximum magnitude of oscillation has been exceeded and that the minimum required rate of decay has not been attained.

5 Claims, 2 Drawing Figures

TORSIONAL OSCILLATION ALARM SYSTEM

BACKGROUND OF THE INVENTION

A. Field of the Invention

This invention relates to torsional oscillation monitoring and more particularly to circuitry for producing alarms when torsional oscillations of a rotating shaft violate predetermined operating criteria.

B. Description of the Prior Art

One form of a vibration monitoring circuit is disclosed by Foster et al in U.S. Pat. No. 3,455,149. Foster et al disclose circuitry for monitoring displacement of a vibrating structure. A first integrating circuit is provided with different time constants depending on whether a peak value or average value of vibration is being measured. A second integrating circuit with an adjustable rise time is employed to reject transient signals. The output signal from the second integrating circuit is compared against a high limit reference voltage and a low limit reference voltage to actuate utilization devices if the output signal exceeds the high limit reference voltage or is less than the low limit reference voltage.

The above-described Foster et al circuit and other prior art circuits have encountered the problem of determining when predetermined acceptable limits of vibration have been exceeded both in terms of magnitude and duration. Foster et al. and other prior art circuitry employ continuous integration of vibration representative signals in rejecting signals of short duration. The resulting integrated signal is then compared against reference values to determine if the magnitude of the vibration is beyond acceptable limits. Thus, a vibration duration analysis and a vibration magnitude analysis have been made interdependent by the prior art circuitry.

The present invention solves the aforementioned and other problems encountered by the prior art by providing a torsional oscillation alarm system which analyzes the oscillation representative signal itself rather than an integrated value thereof to determine if the oscillation is within acceptable limits. A circuit is provided to generate a low level alarm signal when torsional oscillation exceeds a first predetermined magnitude limit and persists for a predetermined length of time. In addition, a separate rate of decay circuit is employed to determine if the torsional oscillation subsides at a predetermined acceptable rate, with this circuit being activated only after a second predetermined magnitude limit has been exceeded. The present invention utilizes both the value of the oscillation signal which resulted in activation of the decay circuit and the instantaneous value of the oscillation signal to make a determination as to whether the torsional oscillation has subsided at the predetermined acceptable rate.

One of the objects of this invention is to provide a torsional oscillation alarm system to generate an alarm signal if the oscillation representative signal exceeds a predetermined magnitude and fails to subside at a predetermined acceptable rate.

Another object is to provide a torsional oscillation alarm system to generate an alarm signal if an oscillation representative signal exceeds a predetermined limit for a predetermined length of time.

SUMMARY OF THE INVENTION

In carrying out this invention, in one form thereof, an alarm system is disclosed for generating alarm signals when torsional oscillations of a rotating shaft exceed predetermined limits and fail to subside at a predetermined rate. The alarm system receives a torsional oscillation input signal developed by measuring the deviation of instantaneous shaft angle from a uniformly increasing value. The input signal is converted to a direct current torsional oscillation signal representative of the magnitude of oscillation. A first comparator compares the torsional oscillation signal against a first adjustable reference voltage representative of a first maximum magnitude of oscillation. A low level alarm signal is generated if the oscillation signal exceeds the first adjustable reference voltage for a predetermined length of time. The low level alarm signal is maintained until the alarm system is reset by actuation of a first push-button.

The oscillation signal is also employed with a rate of decay circuit to produce a high level alarm signal when the torsional oscillations of the rotating shaft exceed a second predetermined limit if the oscillations fail to decrease or subside at a predetermined rate. A second comparator compares the oscillation signal against a second adjustable reference voltage representative of a second maximum magnitude of oscillation. An output signal is generated when the oscillation signal exceeds the second adjustable reference voltage. The output signal is employed to activate a rate of decay circuit.

The rate of decay circuit includes a first capacitor which is charged to a voltage equal to the vibration signal and a second capacitor which is charged to a predetermined voltage. Upon activation of the rate of decay circuit, the first capacitor maintains a charge or voltage equal to the value of oscillation signal which caused activation of the rate of decay circuit. The rate of decay of the vibration signal is then determined by measuring the rate of increase in the charge of the second capacitor wherein the rate of increase is dependent upon the charge of the first capacitor and the peak value of the oscillation signal. A third comparator compares the voltage and thus the charge of the second capacitor against a third adjustable reference voltage representative of a minimum required rate of decay. If the voltage of the second capacitor exceeds the third adjustable reference voltage, the third comparator generates a high level alarm signal indicating that the second maximum magnitude of oscillation has been exceeded and that the minimum required rate of decay has not been attained. The high level alarm signal is maintained until the alarm system is reset by actuation of a second push-button.

DESCRIPTION OF THE PREFERRED EMBODIMENT

Figure 1:
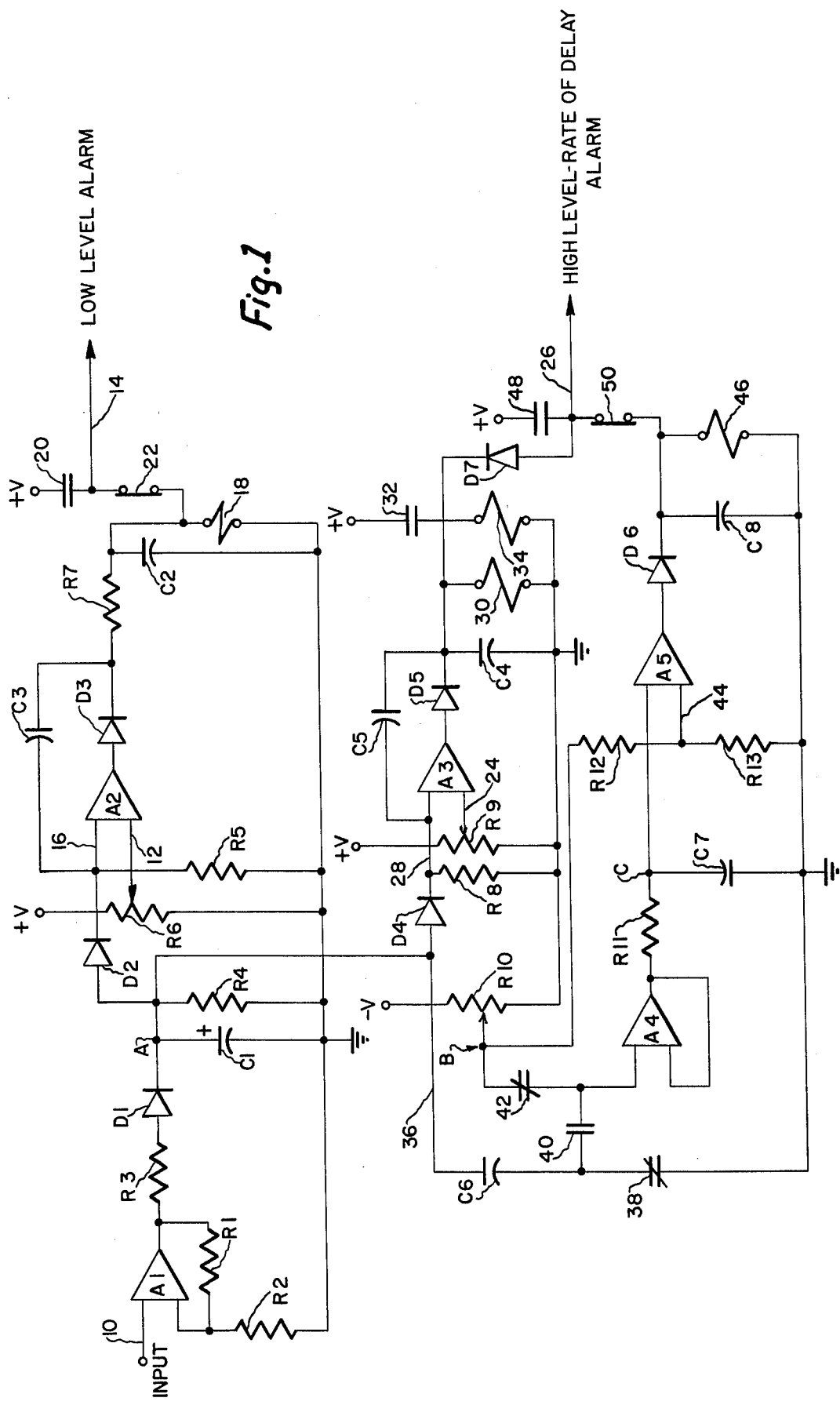
FIG. 1 illustrates one embodiment of the torsional oscillation alarm system of this invention.

As shown in FIG. 1, the alarm system receives a torsional oscillation input signal on line 10. The input signal is developed by measuring the deviation in instantaneous angle of a rotating shaft from a uniformly increasing value. One arrangement for generating such an input signal is disclosed by Wolfinger U.S. Pat. No.

3,885,420 which is assigned to the assignee of this invention. The input signal is received by a high input impedance, buffer amplifier A1 having feedback resistors R1 and R2. The buffer amplifier has an output resistor R3 connected to the anode of a diode D1. The cathode of diode D1 is in turn connected at point A to a capacitor C1 and a resistor R4. The input signal is amplified by the buffer amplifier and fed through the output resistor R3 and then converted by the diode D1, the capacitor C1 and the resistor R4 to a direct current torsional oscillation signal at point A representative of the magnitude of torsional oscillation.

After the input signal is converted to the direct current torsional oscillation signal, the torsional oscillation signal is analyzed to determine if the torsional oscillation of the rotating shaft is within predetermined acceptable limits. The oscillation signal is compared against a first adjustable reference voltage on line 12 to produce a low level alarm signal on line 14 if the oscillation signal exceeds the first adjustable reference voltage for a predetermined length of time. A comparison of the oscillation signal and the first adjustable reference voltage is provided by a comparator A2 having a first input on line 16 and a second input on line 12. The oscillation signal is fed from point A, through diode D2 to resistor R5 connected to line 16. A constant voltage source +V connected to a variable resistor R6 provides the first adjustable reference voltage which is fed on line 12 to comparator A2. The comparator compares the oscillation signal against the first adjustable reference voltage and produces an output signal if the oscillation signal exceeds the first adjustable reference voltage.

The low level alarm signal is generated if the oscillation signal exceeds the first adjustable reference voltage as set by R6 for a predetermined length of time as set by an adjustable resistor R7 and capacitor C2. The comparator output signal is fed through a diode D3 and the adjustable resistor R7 to charge a capacitor C2 which is connected in parallel with a relay 18. The comparator output signal also charges a capacitor C3 connected between D3 and R5 and to line 16. The charging of capacitor C3 causes a reverse biasing of diode D2 which disconnects point A from line 16 at the first input to the comparator and forces the output of comparator A2 to be positive for a time, determined by C3 and R5. After the predetermined length of time as set by adjustable resistor R7, capacitor C2 charges to a sufficient value to operate the relay 18 unless the signal on A has fallen below the threshold. A contact 20 connected between the constant voltage source, +V, and line 14 closes in response to operation of relay 18 to latch relay 18 in an energized state and thus maintain the low level alarm signal on line 14. The low level alarm signal is maintained until the alarm system is reset by actuation of a first push-button having a normally closed contact 22 connected between the relay 18 and line 14.

In addition to providing a low level alarm signal the alarm system of the invention also provides a high level alarm signal when the torsional oscillations of the rotating shaft exceed a second predetermined limit, if the oscillations fail to decrease or subside at a predetermined rate. In order to produce the high level alarm signal, the oscillation signal is first compared by a comparator A3 against a second adjustable reference voltage on line 24 representative of a second maximum magnitude of oscillation. The comparator generates an output signal to activate a rate of decay circuit if the oscillation signal exceeds the second adjustable reference voltage. The rate of decay circuit then generates a high level alarm signal on line 26 if the oscillation signal fails to subside at a predetermined rate.

In order to determine if the oscillation signal has exceeded the second maximum magnitude of oscillation, the oscillation signal is fed from point A to the first input terminal of comparator A3 by way of line 28. The comparator compares the voltage developed across resistor R8 against the second adjustable reference voltage representative of the second maximum magnitude of oscillation. The second adjustable reference voltage is produced by variable resistor R9 connected to constant voltage source +V and is fed on line 24 to a second input terminal of the comparator. The comparator produces an output signal through diode D5 to charge capacitor C4 if the oscillation signal appearing on line 28 exceeds the second adjustable reference voltage on line 24. The output signal also charges a capacitor C5 connected between D5 and C4 and to line 28. The charging of C5 causes a reverse biasing of diode D4 which disconnects point A from the first input of the comparator and forces the output of comparator A3 to be positive for a time determined by C5 and R9. When the output signal is generated by comparator A3, a relay 30 connected in parallel with capacitor C4 is energized. Relay 30 is provided with a contact 32 connected to the voltage source +V and to a relay 34. When relay 30 is energized, contact 32 closes causing energization of relay 34.

After energization of relay 34, which indicates that the second maximum level of oscillation has been exceeded, the rate of decay circuit is activated to determine if the oscillation signal decays at greater than a minimum required rate. If the minimum required rate of decay is not attained, a high level alarm signal is generated on line 26.

In order to produce a signal representative of the rate of decay, a capacitor C6 is connected by line 36 to point A and also connected to contacts 38 and 40 of relay 34. Prior to energization of relay 34, contact 38 is maintained closed connecting capacitor C6 between point A and ground and causing C6 to be charged to the peak voltage of the oscillation signal. An adjustable voltage is produced at point B by variable resistor R10 which is connected to constant voltage source −V. Prior to energization of relay 34, the normal voltage at point B is fed through contact 42, through amplifier A4 and through resistor R11 to charge a capacitor C7 to a predetermined voltage level. The potential across C7 is applied to a first input of a comparator A5. The voltage at point B is also employed with resistors R12 and R13 to produce a third adjustable reference voltage on line 44 which is fed to a second input of the comparator A5.

When the oscillation signal exceeds the second maximum magnitude of oscillation, as set by the second adjustable reference voltage on line 24, comparator A3 produces an output signal which causes energization of relay 34. When the relay is energized contacts 38 and 42 are opened and contact 40 is closed causing capacitor C6 to retain a voltage equal to the peak oscillation signal at the time the output signal from A3 was generated. A voltage equal to the difference between the instantaneous oscillation signal at point A and the voltage of capacitor C6 is fed through contact 40, through amplifier A4 and through resistor R11 to cause a change in the charge of capacitor C7 and thus cause the voltage at point C to increase in a positive manner.

Figure 2:
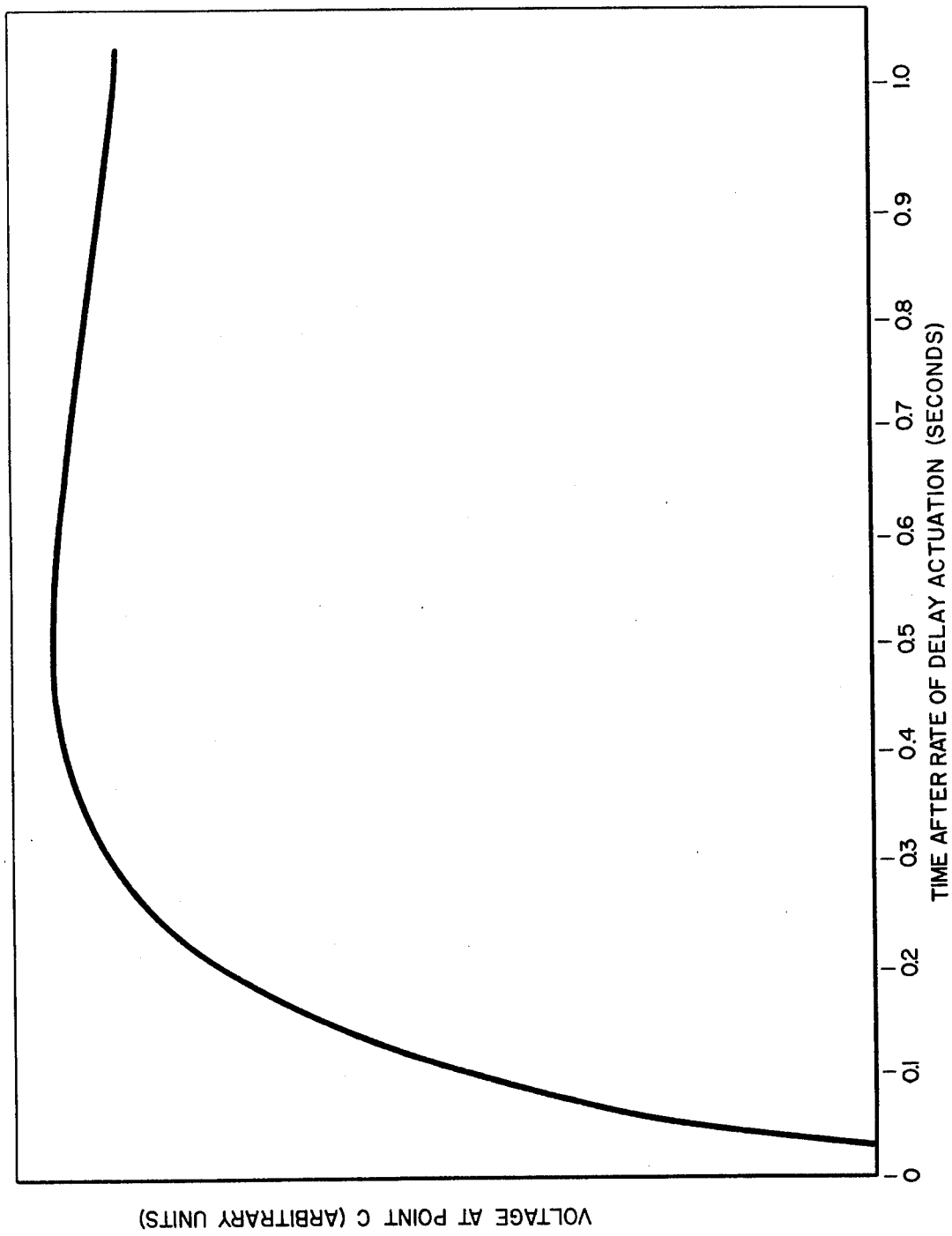
FIG. 2 is a voltage versus time relationship at point C within the circuit of FIG. 1.

As shown in FIG. 2, the voltage at point C increases to a maximum value and then starts to decrease gradually if the voltage at point A remains constant. R11 and C7 are selected to cause the voltage at point C to reach a maximum value at 0.5 second. The actual rate of increase of the voltage at point C is representative of the rate of decay of the oscillation signal. As shown in FIG. 1, the voltage at point C is compared by comparator A5 against the third adjustable reference voltage on line 44. If the voltage at point C exceeds the voltage on line 44, indicating that a minimum required rate of decay of the oscillation signal has not been attained, comparator A5 produces a high level alarm signal through diode D6 to charge capacitor C8. Relay 46 connected in parallel with capacitor C8 maintains the high level alarm signal on line 26 by closing its contact 48 connected between constant voltage source +V, and line 26. A diode D7 connected between line 26 and relay 30 is provided to prevent comparator A3 from prematurely generating the high level alarm and also to maintain a signal at the output of A3 after the high level alarm is generated. The high level alarm signal is maintained until the alarm system is reset by actuation of a second push-button having a normally closed contact 50 connected between relay 46 and line 26.

In operation, buffer amplifier A1 receives the torsional oscillation input signal on line 10 which is developed by measuring the deviation in instantaneous angle of the rotating shaft from a uniformly increasing value. The input signal is then converted to a direct current torsional oscillation signal at point A by diode D1 and capacitor C1. The oscillation signal is then compared by comparator A2 against a first adjustable reference voltage on line 12 representative of the first maximum magnitude of oscillation. If the oscillation signal exceeds the first adjustable reference voltage, the comparator A2 generates an output signal to charge capacitor C2. The output signal also charges capacitor C3 to prevent transmission of the oscillation signal to the comparator for a time determined by C3 and R5. If the oscillation signal exceeds the first adjustable reference voltage for a predetermined length of time as set by adjustable resistor R7, capacitor C2 is charged to a sufficient voltage value to actuate relay 18. When energized, relay 18 causes its contact 20 to close and thus maintain the low level alarm signal until the alarm system is reset by actuation of first push-button contact 22.

The oscillation signal at point A is also fed through diode D4 to comparator A3. The comparator compares the oscillation signal against the second adjustable reference voltage on line 24 representative of the second maximum magnitude of oscillation. If the oscillation signal exceeds the second adjustable reference voltage, the comparator generates an output signal to charge capacitor C4 and operate relay 30. The output signal also charges capacitor C5 which reverse-biases diode D4 to prevent transmission of the oscillation signal to the comparator for a time determined by C5 and R8. When relay 30 is energized, contact 32 closes causing energization of relay 34.

Energization of relay 34 activates the rate of decay circuit by opening contact 38, closing contact 40 and opening contact 42. Capacitor C6 maintains a voltage equal to the peak value of the oscillation signal at the time the output signal of comparator A3 was generated. A voltage equal to the difference between the instantaneous oscillation signal at point A and the voltage across capacitor C6 is buffered by amplifier A4 to cause an increase in the voltage at point C. The rate of the increase in voltage at point C is representative of the rate of decay of the oscillation signal. Voltage at point C is then compared against a third adjustable rate of voltage appearing on line 44 representative of the minimum required rate of decay. If voltage at point C exceeds the voltage on line 44 indicating that the minimum required rate of decay has not been attained, comparator A5 produces a high level alarm signal to charge capacitor C8 and operate relay 46. The contact 48 of relay 46 closes to maintain the high level alarm signal on line 26. The high level alarm signal is also fed through D7 to relay 30 to maintain relay 30 in an energized state. The high level alarm signal is maintained until the alarm system is reset by actuation of the second push-button contact 50.

Although a specific embodiment of the torsional oscillation alarm system has been described, it is not intended that the invention be limited to this embodiment. Accordingly, it is intended by the appended claims to cover all modifications which come within the spirit and scope of the foregoing disclosure.

What is claimed as new and desired to be secured by Letters Patent of the United States is:

1. An alarm system for generating alarms when torsional oscillations of a rotating shaft exceed predetermined limits comprising:
   (a) means for providing a torsional oscillation voltage signal representative of the magnitude of oscillation of said shaft;
   (b) means for providing a first reference voltage representative of a first maximum magnitude of oscillation;
   (c) first comparing means for comparing said torsional oscillation voltage signal against said first reference voltage and for generating a low level alarm signal when said torsional oscillation signal exceeds said first reference voltage for a predetermined length of time;
   (d) means for providing a second reference voltage representative of a second maximum magnitude of oscillation;
   (e) second comparing means for comparing said torsional oscillation signal against said second reference voltage and for generating an output signal when said torsional oscillation signal exceeds said second reference voltage;
   (f) means activated by said output signal for generating a signal representative of the rate of decay of said torsional oscillation signal;
   (g) means for providing a third reference voltage representative of a minimum required rate of decay; and
   (h) third comparing means for comparing said signal representative of the rate of decay of said torsional oscillation signal against said third reference voltage and for generating a high level alarm signal when the rate of decay is less than a predetermined value as set by said third reference voltage.

2. The alarm system according to claim 1, and further including means to adjust the magnitude of said first reference voltage, of said second reference voltage and of said third reference voltage.

3. The alarm system according to claim 1, and further including first means to prevent transmission of said torsional oscillation signal to said first comparing means for a predetermined time after said low level alarm signal is generated.

4. The alarm system according to claim 1, and further including second means to prevent transmission of said torsional oscillation signal to said second comparing means for a predetermined time after said output signal is generated.

5. The alarm system according to claim 1, wherein said means for generating a signal representative of the rate of decay of said torsional oscillation signal includes a capacitor for maintaining a charge proportional to said torsional oscillation signal at the time said output signal is generated and further includes a resistor and capacitor network for generating a signal representative of the rate of decay of said torsional oscillation signal by developing a voltage equal to the difference between the instantaneous value of said torsional oscillation signal and the charge of said capacitor.

* * * * *